US007026730B1

(12) United States Patent
Marshall et al.

(10) Patent No.: US 7,026,730 B1
(45) Date of Patent: Apr. 11, 2006

(54) INTEGRATED CONNECTOR UNIT

(75) Inventors: Robert A. Marshall, Georgetown, TX (US); Anthony L. Randall, Austin, TX (US); Frederick R. Schindler, Sunnyvale, CA (US)

(73) Assignee: Cisco Technology, Inc., San Jose, CA (US)

( * ) Notice: Subject to any disclaimer, the term of this patent is extended or adjusted under 35 U.S.C. 154(b) by 494 days.

(21) Appl. No.: 10/326,236

(22) Filed: Dec. 20, 2002

(51) Int. Cl.
*H01B 11/02* (2006.01)
*H02G 5/06* (2006.01)

(52) U.S. Cl. ........................ 307/147; 307/17; 379/413; 439/620

(58) Field of Classification Search .................. 307/17, 307/151
See application file for complete search history.

(56) References Cited

U.S. PATENT DOCUMENTS

| | | | | |
|---|---|---|---|---|
| 4,131,767 | A | 12/1978 | Weinstein | 179/170.2 |
| 4,161,719 | A | 7/1979 | Parikh et al. | 340/147 SY |
| 4,232,199 | A | 11/1980 | Boatwright et al. | 179/18 B |
| 4,397,020 | A | 8/1983 | Howson | 370/105 |
| 4,532,626 | A | 7/1985 | Flores et al. | 370/85 |
| 4,599,494 | A | 7/1986 | Welty | 179/84 T |
| 4,626,954 | A | 12/1986 | Damiano et al. | 361/96 |
| 4,710,949 | A | 12/1987 | Ahuja | 379/26 |
| 4,723,267 | A | 2/1988 | Jones et al. | 379/93 |
| 4,875,223 | A | 10/1989 | Curtis | 375/36 |
| 4,969,179 | A | 11/1990 | Kanare et al. | 379/33 |
| 5,029,201 | A | 7/1991 | Bindels | 379/98 |
| 5,034,948 | A | 7/1991 | Mizutani et al. | 379/79 |
| 5,056,131 | A | 10/1991 | Kanare et al. | 379/33 |
| RE33,900 | E | 4/1992 | Howson | 370/105 |
| 5,199,049 | A | 3/1993 | Wilson | 375/104 |
| 5,223,806 | A | 6/1993 | Curtis et al. | 333/12 |
| 5,311,518 | A | 5/1994 | Takato et al. | 370/110.1 |
| 5,321,372 | A * | 6/1994 | Smith | 333/1 |
| 5,406,260 | A | 4/1995 | Cummings et al. | 340/568 |
| 5,541,957 | A | 7/1996 | Lau | 375/258 |
| 5,574,748 | A | 11/1996 | Vander Mey et al. | 375/204 |
| 5,612,580 | A | 3/1997 | Janonis et al. | 307/64 |
| 5,655,077 | A | 8/1997 | Jones et al. | 395/187.01 |
| 5,659,542 | A | 8/1997 | Bell et al. | 370/496 |
| 5,671,354 | A | 9/1997 | Ito et al. | 395/187.01 |
| 5,684,950 | A | 11/1997 | Dare et al. | 395/187.01 |
| 5,691,889 | A * | 11/1997 | Bazinet et al. | 363/89 |

(Continued)

FOREIGN PATENT DOCUMENTS

WO WO 99/53408 10/1999

OTHER PUBLICATIONS

IEEE Draft P802.3af/D3.0; IEEE Computer Society, The Institute of Electrical and Electronics Engineers, Inc., 2001.

(Continued)

*Primary Examiner*—Brian Sircus
*Assistant Examiner*—Hal I. Kaplan
(74) *Attorney, Agent, or Firm*—Baker Botts L.L.P.

(57) ABSTRACT

According to one embodiment of the invention, an integrated jack unit is provided. The integrated jack unit includes a housing. The integrated jack unit also includes a jack positioned at least in part in the housing. The integrated jack unit also includes a power controller positioned in the housing and coupled to the jack by a line. The line is designated for coupling with a transformer. The integrated jack unit also includes a pin protruding outwardly from the housing. The pin is electrically coupled to the jack through the power controller and the line. The pin is positioned to receive power for the jack from a printed circuit board.

27 Claims, 4 Drawing Sheets

U.S. PATENT DOCUMENTS

| | | | | |
|---|---|---|---|---|
| 5,796,185 | A | 8/1998 | Takata et al. | 307/140 |
| 5,799,040 | A | 8/1998 | Lau | 375/258 |
| 5,802,042 | A | 9/1998 | Natarajan et al. | 370/255 |
| 5,815,665 | A | 9/1998 | Teper et al. | 395/200.59 |
| 5,918,016 | A | 6/1999 | Brewer et al. | 395/200.5 |
| 5,944,824 | A | 8/1999 | He | 713/201 |
| 5,947,773 | A | 9/1999 | Karam | 439/676 |
| 5,991,885 | A | 11/1999 | Chang et al. | 713/300 |
| 5,994,998 | A | 11/1999 | Fisher et al. | 340/310.01 |
| 6,011,910 | A | 1/2000 | Chau et al. | 395/200.59 |
| 6,021,496 | A | 2/2000 | Dutcher et al. | 713/202 |
| 6,047,376 | A | 4/2000 | Hosoe | 713/201 |
| 6,062,908 | A * | 5/2000 | Jones | 439/620 |
| 6,092,196 | A | 7/2000 | Reiche | 713/200 |
| 6,099,349 | A | 8/2000 | Boutros | 439/541.5 |
| 6,115,468 | A | 9/2000 | De Nicolo | 379/413 |
| 6,134,666 | A | 10/2000 | De Nicolo | 713/300 |
| 6,140,911 | A | 10/2000 | Fisher et al. | 340/310.01 |
| 6,218,930 | B1 | 4/2001 | Katzenberg et al. | 340/310.01 |
| 6,233,613 | B1 * | 5/2001 | Walker et al. | 709/224 |
| 6,295,356 | B1 | 9/2001 | De Nicolo | 379/413 |
| 6,308,240 | B1 | 10/2001 | De Nicolo | 710/300 |
| 6,310,781 | B1 | 10/2001 | Karam | 361/764 |
| 6,347,949 | B1 | 2/2002 | Edwards et al. | 439/170 |
| 6,348,874 | B1 | 2/2002 | Cole et al. | 340/825.013 |
| 6,428,361 | B1 | 8/2002 | Imschweiler et al. | 439/676 |
| 6,535,983 | B1 | 3/2003 | McCormack et al. | 713/310 |
| 6,541,878 | B1 | 4/2003 | Diab | 307/17 |
| 6,554,638 | B1 | 4/2003 | Hess et al. | 439/490 |
| 6,678,176 | B1 | 1/2004 | Lumsden | 363/95 |
| 6,762,675 | B1 | 7/2004 | Cafiero et al. | 340/10.42 |
| 6,764,343 | B1 | 7/2004 | Ferentz | 439/620 |
| 6,804,351 | B1 | 10/2004 | Karam | 379/413 |
| 2002/0063584 | A1 | 5/2002 | Molenda et al. | 327/67 |
| 2002/0180592 | A1 | 12/2002 | Gromov | 340/310.01 |
| 2004/0002319 | A1 | 1/2004 | Lin | 455/318 |
| 2004/0156496 | A1 | 8/2004 | Karam | 379/413 |
| 2004/0164619 | A1 | 8/2004 | Parker et al. | 307/80 |

OTHER PUBLICATIONS

IEEE Draft P802.3af/D3.01; IEEE Computer Society, The Institute of Electrical and Electronics Engineers, Inc., 2001.

IEEE Draft P802.3af/D3.1; IEEE Computer Society, The Institute of Electrical and Electronics Engineers, Inc., 2002.

IEEE Draft P802.3af/D3.2; IEEE Computer Society, The Institute of Electrical and Electronics Engineers, Inc., 2002.

IEEE Draft P802.3af/D4.0; IEEE Computer Society, The Institute of Electrical and Electronics Engineers, Inc., 2002.

"*IEEE Standards*"; 802.3af™; IEEE Computer Society, The Institute of Electrical and Electronics Engineers, Inc., Jun. 18, 2003.

IEEE Draft P802.3af/D4.01; IEEE Computer Society, The Institute of Electrical and Electronics Engineers, Inc., 2003.

"Integrated Connector Modules Gigabit belStack™ with LEDs", Bel Fuse Inc., Oct., 2002.

Kiss, Peter (candidate), "Chapter 3, Cascaded Delta-Sigma ADCs", Thesis; "Politehnica" University of Timisoara; cover page plus pp. 45-71, Aug. 20, 1999 revised; Dec. 31, 1999.

Daniel Dove, Powerpoint Presentation, "Power over the DTE", Jan. 2000.

Robert Muir, Powerpoint Presentation: "Update on Diode Discovery Process", May 2000.

Frederick R. Schindler, "System and Method for Providing Indicators Within a Connector Assembly," U.S. Appl. No. 10/430,513; 35 pages, filed May 6, 2003.

"Data Terminal Equipment (DTE) Power via Media Dependent Interface (MDI)", IEEE P802.3af/D3.01 (Revision of IEEE Std. 802.3-2000), May 2002.

"33. Data Terminal Equipment (DTE) Power via Media Dependent Interface (MDI)", Draft Supplement to IEEE Standard 802.3 (IEEE Draft P802.3af/D3.2), Sep. 5, 2002.

"Amendment: Data Terminal Equipment (DTE) Power via Media Dependent Interface (MDI)", IEEE Draft P802.3af/D4.3, (IEEE Standards Department, Draft Amendment 802-3-2002), Apr. 2003.

Hugh Barrass, "Multi-Pair Aggregate Power Distribution"—U.S. Appl. No. 10/287,886, pp. 1-25, filed Nov. 4, 2002.

Jeffrey D. Provost, "Inline Power Control"—U.S. Appl. No. 10/618,211, pp. 1-15, filed Jul. 11, 2003.

Daniel C. Biederman, "Inline Power Based Device Communications"—U.S. Appl. No. 10/651,596, pp. 1-27, filed Aug. 29, 2003.

Cafiero, et al. "Method and Apparatus for Remote Powering of Device Connected to Network"—U.S. Appl. No. 10/836,923, pp. 1-16, filed Apr. 29, 2004.

Roger A. Karam, "Method and Apparatus for Detecting a Compatible Phantom Powered Device Using Common Mode Signaling"—U.S. Appl. No. 10/855,212, pp. 1-29, filed May 26, 2004.

* cited by examiner

INTEGRATED CONNECTOR UNIT

TECHNICAL FIELD OF THE INVENTION

This invention relates generally to the field of communications and more particularly to an integrated connector unit.

BACKGROUND OF THE INVENTION

A communications switch, such as an ethernet switch, allows a plurality of communications devices to communicate with one another. To establish a conduit for data between the communications switch and the communications device, a connector may be coupled to the printed circuit board ("PCB") of the communications switch so that the communications device may plug into the connector. A connector is also referred to as a "jack." Where possible, the communication device may also receive power from the jack. Providing power through the jack eliminates the need for the communications device to have a separate power source, such as an AC/DC power source. Power provided through the jack is referred to as "inline power."

Jacks are sometimes manufactured as a jack unit that includes in its housing one or more jacks and some of the components for carrying data. For example, isolation transformers for the data lines may be included in the housing of a jack unit. The pins of a jack unit may be soldered onto the PCB to electrically couple the data components in the housing of jack unit to the appropriate components of the PCB. Including some of the components for carrying data in the housing saves board space on the PCB. However, positioning the isolation transformers in the housing of the jack unit may not allow inline power to be provided to the communications devices that plug into the jack unit. This is because the jack side of the isolation transformer, which must be accessible to provide inline power, is blocked by the housing of the jack unit. Thus, inline power may not be available where the isolation transformers are included in a jack unit.

SUMMARY OF THE INVENTION

According to one embodiment of the invention, an integrated jack unit is provided. The integrated jack unit includes a housing. The integrated jack unit also includes a jack positioned at least in part in the housing. The integrated jack unit also includes a power controller positioned in the housing and coupled to the jack by a line. The line is designated for coupling with a transformer. The integrated jack unit also includes a pin protruding outwardly from the housing. The pin is electrically coupled to the jack through the power controller and the line. The pin is positioned to receive power for the jack from a printed circuit board.

Some embodiments of the invention provide numerous technical advantages. Some embodiments may benefit from some, none, or all of these advantages. For example, according to one embodiment, inline power may be provided through integrated jack units. According to another embodiment, the design of a main printed circuit board is simplified without substantially complicating the design of the jack unit. According to another embodiment, the overall manufacturing process of networking equipment is simplified because jack units having integrated isolation transformers may be used for both Ethernet, non-Ethernet, standard Ethernet, and inline Ethernet applications. According to another embodiment, a same printed circuit board design may be used for both standard and inline powered systems because the inline power circuitry is in the jack unit.

Other technical advantages may be readily ascertained by one of skill in the art.

BRIEF DESCRIPTION OF THE DRAWINGS

Reference is now made to the following description taken in conjunction with the accompanying drawings, wherein like reference numbers represent like parts, in which.

DETAILED DESCRIPTION OF EXAMPLE EMBODIMENTS OF THE INVENTION

Embodiments of the invention are best understood by referring to FIGS. 1 through 4 of the drawings, like numerals being used for like and corresponding parts of the various drawings.

Figure 1:
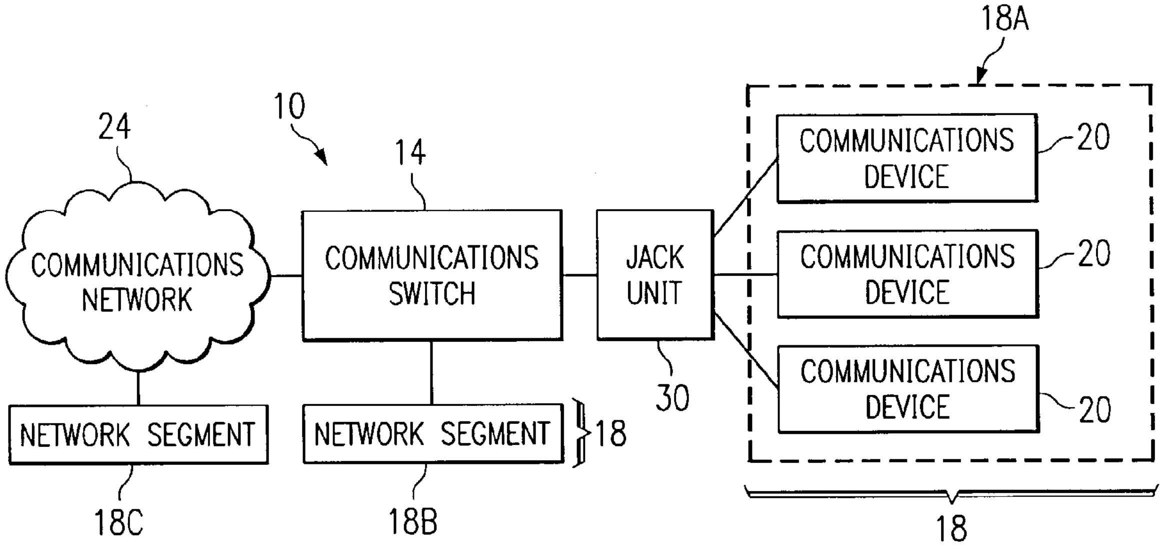
FIG. 1 is a schematic diagram illustrating one embodiment of a communications system that may benefit from the teachings of the present invention.

FIG. 1 is a schematic diagram illustrating one embodiment of a communications system 10 that may benefit from the teachings of the present invention. System 10 comprises network segments 18A through 18C that are coupled to each other over a communications network 24 and/or a communications switch 14. Network segments 18A through 18C are jointly referred to as network segments 18. As shown in FIG. 1, network segment 18A is coupled to network segment 18B over communications switch 14. Network segment 18C is coupled to network segments 18A and 18B over communications network 24 and communications switch 14. More or less network segments 18 may be coupled to each other over communications network 24 and communications switch 14.

Network segments 18A through 18C each comprises one or more communications devices 20. A jack unit 30 is coupled to communications switch 14 to provide one or more ports (not explicitly shown) that may be used to physically connect communications devices 20. For example, a cable having plugs may be used to plug in communications devices 20 to jack unit 30. In some embodiments, switch 14 and network segments 18 may be devices that are capable of operating according to the ethernet network standard.

Communications switch 14 may be operable to send and receive packets to and from communications devices 20 according to the addresses of the packets. Upon receiving one or more packets from device 20, switch 14 sends the received packets to a particular communications device 20 that is identified by the included address. Switch 14 may send and receive the packets over network 24, jack unit 30, or any other suitable conduit or a combination of conduits that couples switch 14 to communications devices 20. In some examples, a hub, a router, or any other suitable device may be used instead of switch 14. Communications device 20 may be any communications device that is operable to communicate with other communications devices over a network architecture. Examples of communications device 20 include a Voice over Internet Protocol ("VoIP") phone and a computer.

Jack unit 30 may comprise one or more RJ-45 jacks; however, jack unit 30 may comprise other types of jacks. Where jack unit 30 comprises RJ-45 jacks, communications devices 20 may plug into jack unit 30 using cables having plugs that are adaptable to an RJ-45 jack. Jack unit 30 may also comprise one or more isolation transformers within its housing. A jack unit having isolation transformers within its housing is referred to as a "mag jack." Thus, jack unit 30 may also be referred to as mag jack 30. An isolation transformer is a transformer that is operable to protect the components of switch 14, such as integrated circuit chips, against excessive common mode voltages from communications devices 20 and/or cables attaching devices 20 to switch 14. Mag jack 30 generally includes outwardly disposed pins that may be soldered onto the appropriate apertures of a printed circuit board of communications switch 14, thereby electrically coupling the components of mag jack 30 to the components of communications switch 14. The use of mag jack 30 saves space on the main printed circuit board ("PCB") of switch 14 because the isolation transformers are in mag jack 30 rather than on the PCB.

To send and receive packets from switch 14, communications device 20 may establish a physical connection with switch 14. To that end, communications device 20 may plug into mag jack 30. Along with a physical connection to switch 14, communications device 20 may also require access to power in order to send and receive packets to and from switch 14. Power may be provided to communications device 20 in a variety of ways. For example, alternating current ("AC") power may be provided to communications device 20 by plugging communications device 20 into a wall socket. In another example, communications device 20 may receive direct current ("DC") power from a battery pack. Power may also be provided inline, which refers to transmitting power from switch 14 to communications device 20 over a jack unit and the physical cable that plugs into the jack unit. One advantage of providing inline power to communications device 20 is that it eliminates the need to provide a separate power source for device 20 at the physical location of device 20. Providing inline power also simplifies the design and configuration of communications device 20.

However, inline power is conventionally not provided for communications devices 20 plugged into a mag jack because the housing of the mag jack that integrates the isolation transformers to the jack unit also prevents a designer from injecting power into the side of the transformer that is electrically coupled to a jack of the mag jack. If inline power is not provided to the jack-side of the isolation transformer, then DC power is required to travel across the isolation transformer to reach the jack and thus is blocked by the isolation transformer. Also, AC line power may not pass readily across the isolation transformer. In some situations, it may be difficult for a designer to simply add a pin to a mag jack to access the jack side of the isolation transformer 30 for power injection because the proximity of the pins may cause an arcing of the power current. Thus, conventionally, the benefits of inline power are not available for a mag jack.

According to some embodiments of the present invention, an apparatus and method are provided that allow inline power to be provided for a mag jack by positioning a power controller within the mag jack. Additional details of example embodiments of the invention are described in greater detail below in conjunction with portions of FIG. 1 and FIGS. 2A through 4.

Referring back to FIG. 1, in one embodiment of the invention, a power controller that controls inline power is positioned in mag jack 30 along with one or more isolation transformers. In another embodiment, a power converter that supplies the inline power is also positioned in mag jack 30. Because the power controller is in the housing of mag jack 30, inline power may be injected into the jack side of the isolation transformer to provide inline power for the jacks of mag jack 30. A mag jack having a power controller in its housing is referred to as an "integrated inline power mag jack" or an "power mag jack." As such, mag jack 30 is referred to from hereinafter as power mag jack 30.

Figure 2A:
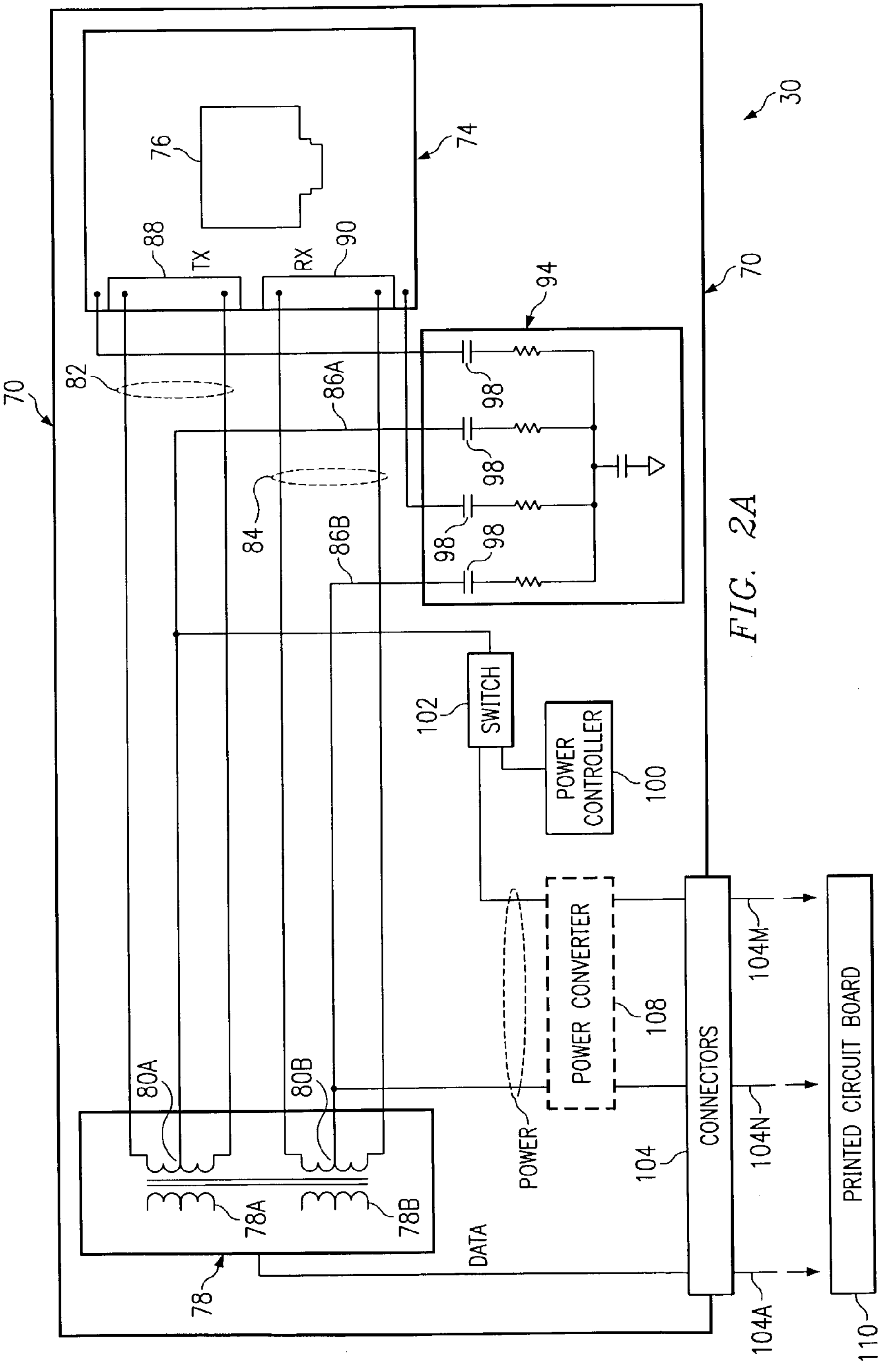
FIG. 2A is a schematic diagram illustrating one embodiment of an integrated jack unit of FIG. 1.
Figure 2B:
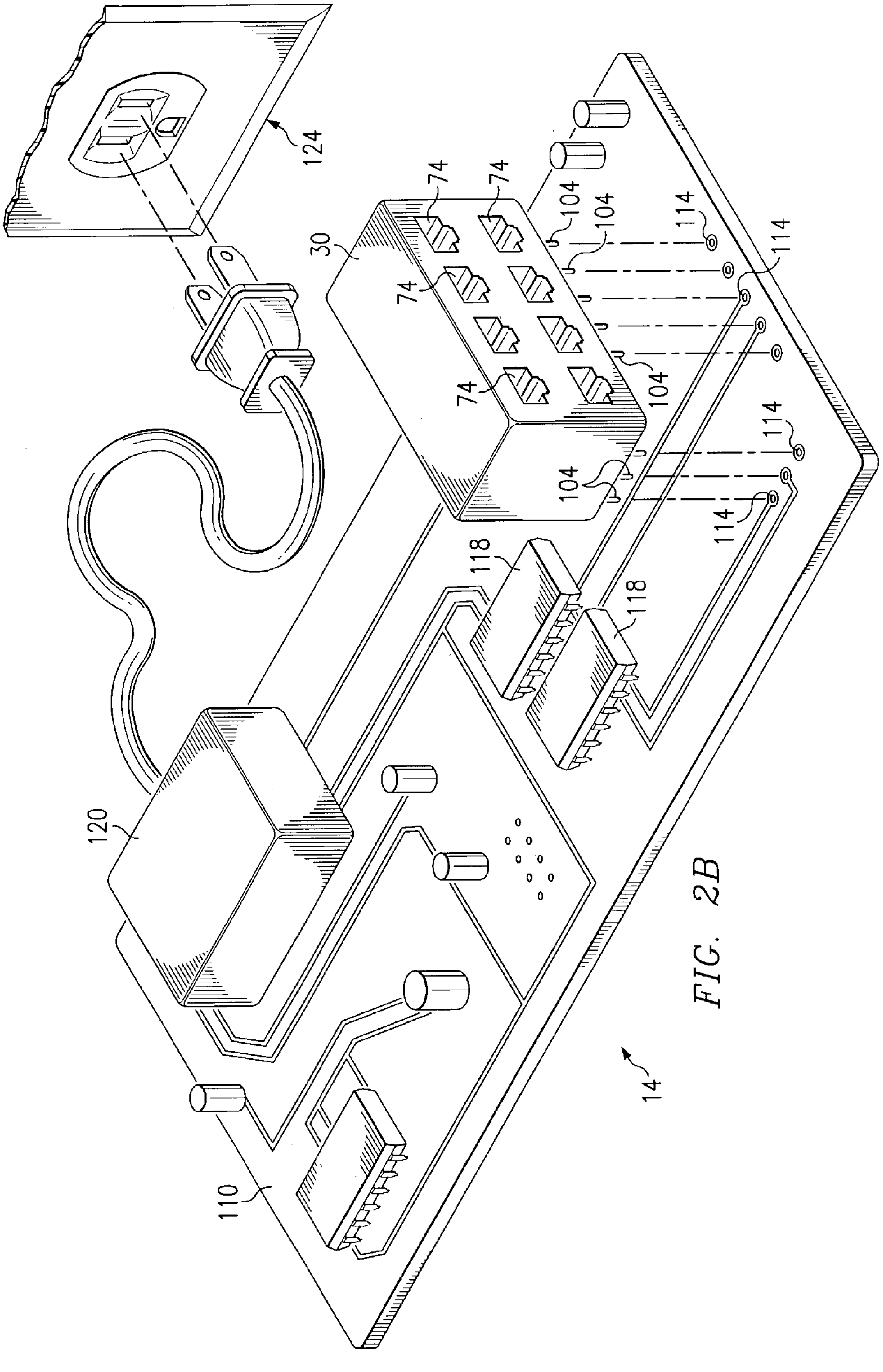
FIG. 2B is a perspective view of one embodiment of the integrated jack unit of FIG. 2A.

FIG. 2A is a schematic diagram illustrating one embodiment of power mag jack 30 of FIG. 1, and FIG. 2B is a perspective view of one embodiment of power mag jack 30 of FIG. 2A. FIGS. 2A and 2B are described jointly. Power mag jack 30 comprises a housing 70. Housing 70 defines power mag jack 30 as a separate component separate from a PCB 110. As shown in FIG. 2B, power mag jack 30 is a device that is separate from PCB 110 that may be added or removed from PCB 110 as a single component of PCB 110. PCB 110 is also referred to as motherboard 110. Referring back to FIG. 2A, a jack 74 defining a receiving cavity 76 is positioned at least in part in housing 70. In one embodiment, an isolation transformer set 78 having at least two transformers 78A and 78B is positioned within housing 70 and coupled to jack 74 through lines 82 and 84. Isolation transformer set 78 may protect integrated circuit chips from electricity having a voltage equal to or less than a predetermined level. In one embodiment that level may be 1.5 kilovolts. Because lines 82 and 84 couple isolation transformer set 78 to jack 74, lines 82 and 84 are also referred to as "jack side" lines 82 and 84. In some embodiments, more than one jack 74 may be included in power mag jack 30. In such embodiments, the number of components that support jack 74, such as the number of transformers 78A and 78B in isolation transformer set 78, may be increased to support the additional jacks 74. However, regardless of the number of jacks 74 in power mag jack 30, all of jacks 74 and their supporting components are packaged as a single component within housing 70.

In one embodiment, lines 82 couple transformer 78A to a data transmission portion 88 of jack 74. Data transmission portion 88 is used for outgoing packets. Lines 84 couple transformer 78B to a data receive portion 90 of jack 74. Data receive portion 90 is used for incoming packets. In one embodiment, lines 86A and 86B are coupled to respective center taps 80A and 80B of transformers 78A and 78B. Lines 86A and 86B are operable to carry inline power for jack 74 without going through transformer set 78 so that inline power may be available for communications devices 20, which may be plugged into jack 74. In one embodiment, lines 86A and 86B are terminated by a termination 94 prior to reaching jack 74. A termination 94 is a load that is positioned within housing 70 and used to minimize common node noise. In one embodiment, termination 94 may comprise one or more DC blocking capacitors 98. In one embodiment, three or fewer DC blocking capacitors 98 may be used. In some embodiments, a BOB SMITH termination may be used as termination 94; however, any other suitable termination may be used as termination 94.

According to the teachings of the invention, a power controller 100 is positioned in housing 70 of power mag jack 30 to provide inline power. In one embodiment, power controller 100 is coupled to center tap 80A through a power switch 102 and line 86A; however, in some embodiments, power controller 100 may be coupled to center tap 80B through power switch 102 and line 86B. Positioning power controller 100 in housing 70 of power mag jack 30 rather than on motherboard 110 of switch 14 (shown in FIG. 1) is advantageous in some embodiments of the invention for the following reason. Because power controller 100 is inside of housing 70, power controller 100 is not physically prevented by housing 70 from physically coupling to one or more of jack side lines 86A or 86B. With physical access to jack side lines 86A and 86B, power controller 100 may provide inline power to jack 74. Thus, manufacturing power controller 100 as a part of power mag jack 30 allows a designer to benefit from the advantages of integrating isolation transformers into a jack unit and the advantages of providing inline power to communications device 20. In some embodiments, isolation transformer set 78 may not be included in housing 70. Power controller 100 may be positioned within housing 70 that does not include isolation transformer set 78. This is advantageous in some embodiments because, regardless of the type of jack unit, a printed circuit board receiving the jack unit may be manufactured using a same design because the circuitry for controlling inline power, if any, would be in the jack unit and not on the printed circuit board.

Figure 3:
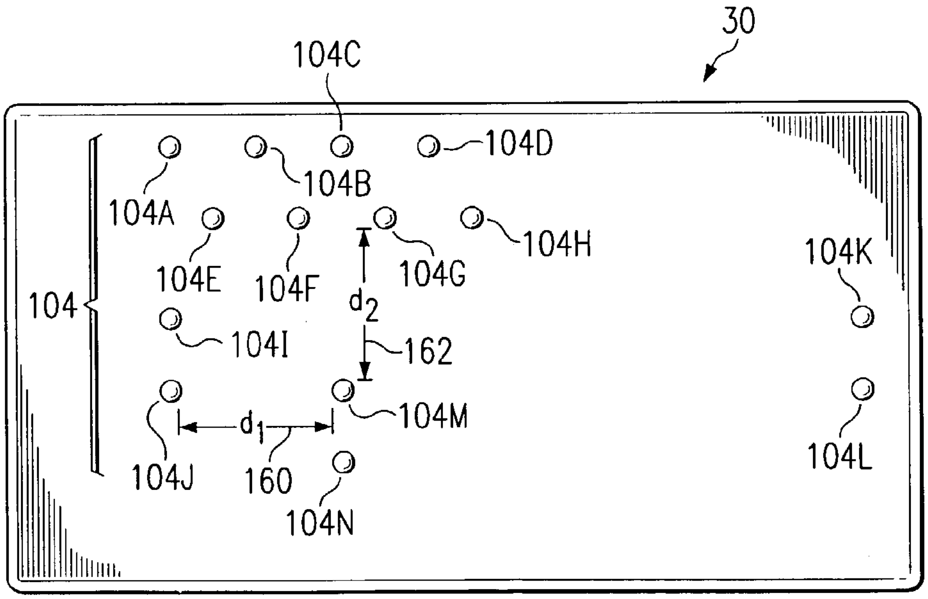
FIG. 3 is a bottom view of one embodiment of the integrated jack unit of FIG. 2B.

Power mag jack 30 may be coupled to PCB 110 by soldering connectors 104 to their corresponding apertures 114 (shown in FIG. 2B) of PCB 110. Connectors 104 are also referred to herein as pins 104. A "pin" refers to any type of connector, such as an edge connector or a mating connector. By coupling pins 104 to their corresponding apertures 114, the various devices of power mag jack 30 are electrically coupled to the appropriate components of PCB 110. For example, as shown in FIG. 3, pin 104A may be inserted into a particular aperture 114 that is connected to one or more physical devices 118. Because pin 104A is also coupled to isolation transformer set 78, pin 104A may be used as a data pin that carries data between physical devices 118 of PCB 110 and isolation transformer set 78. In one embodiment, physical device 118 is an ethernet physical layer transceiver 118. Physical device 118 may be operable to perform a variety of functions associated with communication depending on the network standard being used. For example, if physical device 118 were an ethernet physical device 118, ethernet physical device 118 may perform some or all of the layer one functions, such as packeting TCP/IP packets received from communications device 20 over isolation transformer set 78 into ethernet packets. PCB 110 may also include a power converter 120 that may be coupled to a power source 124. In one embodiment, pins 104M and 104N that are coupled to switch 102 and center tap 80B, respectively, may be inserted into particular apertures 114 that are connected to power converter 120 of PCB 110.

In one embodiment, a power converter 108 may also be positioned in power mag jack 30. This is advantageous in some embodiments because of the resulting savings in board space on motherboard 110. Although FIG. 2A shows power converter 108 positioned in housing 70, power converter 108 may also be positioned outside of housing 70 and on motherboard 110 as a separate component. In such embodiments, DC power having 48 volts may be received from an outside power converter 108 through one or more of pins 104, such as pins 104M and 104N. In one embodiment, when power mag jack 30 is coupled to motherboard 110, pin 104M may be used to receive power and carry that power to power switch 102 controlled by power controller 100 or directly to power controller 100. In one embodiment, power switch 102 is a simple on/off switch; however, a variable resistance element may be used as power switch 102. In one embodiment, power converter 108 is operable to receive AC power and provide DC power for power switch 102. In one embodiment, power converter 108 is operable to provide DC power having a level of 48 volts. In one embodiment, some pins 104 may be used to couple different devices in power mag jack 30 to other appropriate portions of motherboard 110. In one embodiment, power may be provided to ethernet unused pairs (not explicitly shown). Such an embodiment does not require isolation transformers.

FIG. 3 is a bottom view of portions of the power mag jack 30 illustrated in FIGS. 2A and 2B, showing the placement of pins 104. As shown in FIG. 3, one embodiment of power mag jack 30 comprises pins 104A through 104N (jointly referred to as pins 104) that are protruding outwardly from housing 70 of power mag jack 30. In one embodiment, power mag jack 30 may comprise more pins 104 than conventional jack units because inline power is provided to power mag jack 30. In some embodiments where an ethernet standard is used, pins 104 may serve the following functions: Pin 104A carries an ethernet TX negative pulse. Pin 104B carries an ethernet center tap TX bias. Pin 104C carries an ethernet TX positive pulse. Pins 104D and 104E are no connect pins. In some embodiments, pins 104D and 104E may be omitted. Pin 104F carries an ethernet RX center tap bias. Pin 104G carries an ethernet RX negative pulse. Pin 104H carries an ethernet RX positive pulse. The extra pins 104 for providing inline power are pins 104I through 104N, in one embodiment. Pin 104I carries serial clock input signals. Pin 104J carries serial data input signals. Pin 104K carries serial clock output signals. Pin 104L carries serial data output signals. Pin 104M is for ethernet power main. Pin 104N is for ethernet power return. Although a particular arrangement of pins 104 is shown in FIG. 3, other arrangements of pin 104 are possible in other embodiments. Further, more or less pins 104 may be used for power mag jack 30 depending on the design specifications. In one embodiment, distances $d_1$ and $d_2$ referred to by reference numbers 160 and 162, respectively, may be sufficiently wide to lower the probability of arcing between pins 104A through 104L and power pins 104M and 104N. In one embodiment, power converter 108 may comprise an isolation barrier (not explicitly shown) to reduce the distances referred to by reference numbers 160 and 162. Examples of an isolation barrier include a transformer, a capacitor, and an optocoupler.

Figure 4:
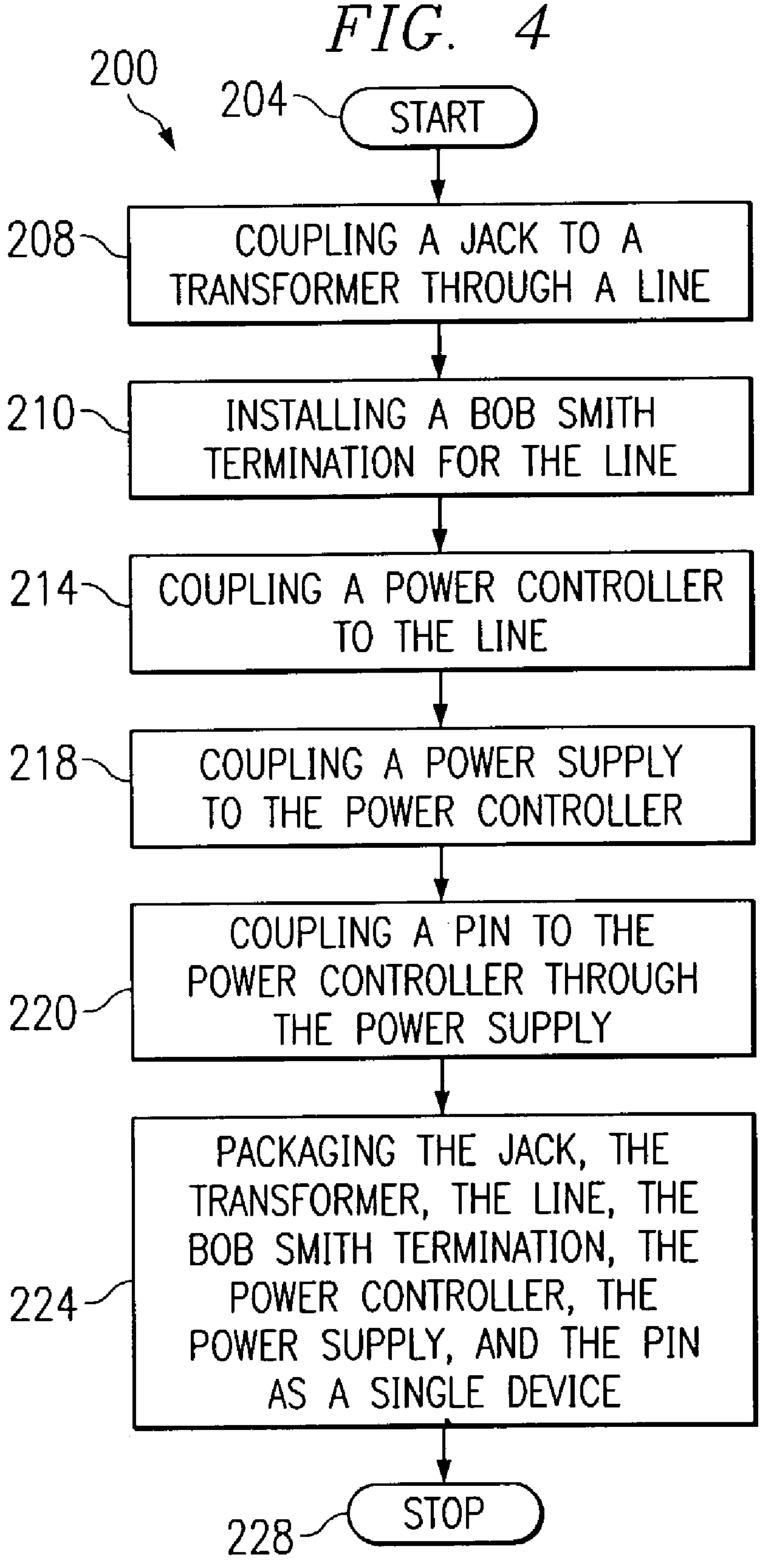
FIG. 4 is a flow chart illustrating one embodiment of a method of providing inline power through one embodiment of the integrated jack unit of FIG. 2A.

FIG. 4 is a flow chart illustrating one embodiment of a method 200 for providing inline power through one embodiment of power mag jack 30. Method 200 starts at step 204. At step 208, jack 74 is coupled to isolation transformer set 78 through a line, such as line 86A or 86B. At step 210, a termination 94 is installed for the line. In some embodiments, step 210 may be omitted. In some embodiments, a BOB SMITH termination may be used as termination 94; however, any other suitable termination may be used as termination 94. At step 214, power controller 100 is coupled to the line. Coupling power controller 100 to the line allows power to be injected into center taps 80 that are positioned on the jack-side of isolation transformer set 78. At step 218, power converter 108 is coupled to power controller 100. In one embodiment, step 218 may be omitted. At step 220, connector 104, such as pins 104, may be coupled to power controller 100. In an embodiment where power converter 108 is included in power mag jack 30, pin 104 is coupled to power controller 100 through power converter 108. At step 224, jack 74, isolation transformer set 78, the line, such as line 86A or 86B, BOB SMITH termination 94, power controller 100, power converter 108, and pins 104 are packaged using housing 70 as a single component 30 that may be coupled to PCB 110. In some embodiments, BOB SMITH termination 94 or power converter 108 may be omitted from being packaged in housing 70 at step 224. Method 200 stops at step 228.

Although some embodiments of the present invention have been described in detail, it should be understood that various changes, substitutions, and alterations can be made hereto without departing from the spirit and scope of the invention as defined by the appended claims.

What is claimed is:

1. An integrated RJ jack unit, comprising:

a housing;

an RJ jack positioned at least in part in the housing;

a BOB SMITH termination positioned in the housing and coupled to the RJ jack;

at least two isolation transformers positioned in the housing, each of the isolation transformers having a center tap that is coupled to the BOB SMITH termination by a line;

a power controller coupled to the line through a power switch, the power controller located in the housing; and a pin protruding outwardly from the housing, the pin electrically coupled to the RJ jack through the power controller, the line, and the BOB SMITH termination, wherein the pin is positioned to receive power for the jack from a printed circuit board.

2. The integrated RJ jack unit of claim 1, and further comprising a power converter positioned in the housing and coupled to the pin and the power controller.

3. The integrated RJ jack unit of claim 1, wherein the RJ jack is an RJ-45 jack.

4. The integrated RJ jack unit of claim 1, and further comprising a power converter positioned in the housing and coupled to the pin and the power controller, wherein the power converter is operable to receive power through the pin and in response provide electricity having 48 volts.

5. The integrated RJ jack unit of claim 1, and further comprising a power converter positioned in the housing and coupled to the pin and the power controller, wherein the power converter is operable to receive alternating current through the pin and in response provide direct current.

6. The integrated RJ jack unit of claim 1, and further comprising a power converter positioned in the housing and coupled to the pin and the power controller, wherein the power converter is operable to receive alternating current through the pin and in response provide direct current having 48 volts.

7. An integrated RJ jack unit, comprising:

a housing;

an RJ jack positioned at least in part in the housing;

at least two isolation transformers positioned in the housing, each of the isolation transformers having a center tap that is coupled to the RJ jack by a line;

a power controller coupled to the line through a power switch, the power controller located in the housing;

a power converter positioned in the housing and coupled to the power controller; and a pin protruding outwardly from the housing, the pin electrically coupled to the RJ jack through the power converter and the line, wherein the pin is positioned to receive power for the RJ jack from a printed circuit board.

8. The integrated RJ jack unit of claim 7, and further comprising a BOB SMITH termination positioned in the housing and coupled to the line.

9. The integrated RJ jack unit of claim 7, wherein the power converter is operable to receive alternating current through the pin and in response provide direct current having 48 volts.

10. An integrated jack unit, comprising:

a housing;

a jack positioned at least in part in the housing;

a power controller positioned in the housing and coupled to the jack by a line, wherein the line is designated for coupling with a transformer; and a pin protruding outwardly from the housing, the pin electrically coupled to the jack through the power controller and the line, wherein the pin is positioned to receive power for the jack from a printed circuit board.

11. The integrated jack unit of claim 10, and further comprising a termination having one or more direct current blocking capacitors, the termination positioned in the housing and coupled to the line.

12. The integrated jack unit of claim 10, and further comprising a power converter positioned in the housing, the power converter coupled to the pin and the power controller.

13. The integrated jack unit of claim 10, and further comprising a power converter positioned in the housing, the power converter coupled to the pin and the power controller, wherein the power converter is operable to receive power through the pin and in response provide power having a level of 48 volts to the power controller.

14. The integrated jack unit of claim 10, and further comprising a power converter positioned in the housing, the power converter coupled to the pin and the power controller, wherein the power converter is operable to receive alternating current through the pin and in response provide direct current.

15. The integrated jack unit of claim 10, and further comprising a power converter positioned in the housing, the power converter coupled to the pin and the power controller, wherein the power converter is operable to receive alternating current through the pin and in response provide direct current having a level of 48 volts.

16. The integrated jack unit of claim 10, wherein the jack is is an RJ-45 jack.

17. An integrated RJ jack unit, comprising:

a housing means;

an isolation means for protecting integrated circuit chips from electricity having a voltage equal to or less than a predetermined level, the isolation means positioned in the housing means;

means for receiving an RJ plug positioned at least in part in the housing means and coupled to the isolation means by a line;

means for controlling power coupled to the line and located in the housing means; and a conductive means for receiving power, the conductive means protruding outwardly from the housing means and electrically coupled to the means for receiving the RJ plug by the means for controlling power and the line.

18. The integrated RJ jack unit of claim 17, and further comprising means for supplying power coupled to the conductive means and the means for controlling power, the means for supplying power positioned in the housing means.

19. The integrated RJ jack unit of claim 17, wherein the predetermined level is 1.5 kilovolts.

20. A method for providing inline power using an integrated jack unit, comprising:

coupling a jack to a transformer set through a line, the transformer set comprising at least two transformers;

coupling a power controller to the line;

coupling a pin to the power controller; and packaging the jack, the transformer set, the line, and the power controller in a housing, wherein the pin is disposed outwardly from the housing to engage a portion of a printed circuit board.

21. The method of claim 20, and further comprising positioning a termination in the housing and coupling the termination to the line.

22. The method of claim 20, and further comprising:

providing a termination having one or more direct current blocking capacitors;

positioning the termination in the housing; and coupling the termination to the line.

23. The method of claim 20, and further comprising positioning a power converter in the housing and coupling the power converter to the pin and the power controller.

24. The method of claim 20, and further comprising:

positioning a power converter in the housing;

coupling the power converter to the pin and the power controller;

using the power converter, receiving alternating current; and using the power converter, converting the alternating current to direct current.

25. The method of claim 20, wherein the jack is a RJ-45 jack.

26. The method of claim 21, wherein the termination is a BOB SMITH termination.

27. The method of claim 20, and further comprising receiving, at the pin, a direct current from a printed circuit board.

* * * * *